Patented May 3, 1949

2,469,039

UNITED STATES PATENT OFFICE 2,469,039

PUNCTURE SEALING COMPOSITION

Charles O. Hopping, Long Beach, Calif.

No Drawing. Application March 7, 1947,
Serial No. 733,199

1 Claim. (Cl. 106—33)

This invention relates to liquid composition of the character employed in single tube tires and in the inner tube of double tube tires to stop the leaks caused by punctures made by nails and the like which penetrate the air-holding tube of the tire.

An object of this invention is to provide a composition of this description that is efficient for the purpose for which it is designed and that will not have any deleterious effect upon the tire in which it is placed.

Other objects and advantages will appear in the subjoined detailed description.

The foundation or base of this composition is kelp or seaweed. The kelp or seaweed as taken from the ocean is first placed in a tank, which is filled with fresh water. This is allowed to stand for five hours, during which time the contents is frequently stirred. The liquid is then drawn off the tank and is then subsequently used in the final production of my composition. This solution has the feel and appearance of a rubber sap.

In preparing my composition, I use one quart of the water which is drained from the tank in which the kelp is soaked. I then add six tablespoons of ground flaxseed, one-fourth ounce of steel wool which is finely cut or powdered, six tablespoons of ground slippery elm, and ten tablespoons of water floated silica. One quart of the liquid drained from the tank is placed in a kettle, and the steel wool is then added. The liquid is brought to a boil, then the silica is added, and continuously stirred; then add the ground flax seed and finally the slippery elm, all in the proportions recited above. When the contents thickens, it is taken from the fire, and sufficient of the liquid taken from the tank previously stated is added to thin the composition to a point where it can be forced into the tire through the valve. In the proportions herein stated, the final product will be a quart.

In place of the steel wool, I may substitute one-fourth pound of kelp which has previously been soaked in water as stated, and the kelp being finely cut, powdered or macerated. The proportions of the remaining substances in the composition are the same as previously stated.

To use the composition thus made, it will be poured or forced through the valve stem of the tire into the tire, a pint more or less being required for each tire treated, the amount varying according to the size of the tire. If a nail or other puncturing object should penetrate an air inflated tire containing my composition, the object is withdrawn and immediately the composition is forced by the compressed air in the tire, into the puncture. The fibre of the composition completely seals the puncture and completely prevents the escape of air. The fibre thus forced into the puncture amalgamates more or less with the tire and the fibre in the outer surface of the puncture dries and solidifies and prevents not only the escape of air, but also the escape of the liquid in the tire.

I do not desire to limit my invention to the employment of the exact proportions above specified, since different proportions can be employed to produce the desired results. The substances which I employ are not injurious to the rubber of the tire and are inexpensive and easy to compound.

Having described my invention, I claim:

The herein described composition for the purpose described, comprising one quart of water in which kelp has been soaked, six tablespoons of ground flax seed, one-quarter ounce steel wool, six tablespoons ground slippery elm, ten tablespoons of water floated silica.

CHARLES O. HOPPING.

REFERENCES CITED

The following references are of record in the file of this patent:

UNITED STATES PATENTS

| Number | Name | Date |
|---|---|---|
| 1,413,524 | Dolan | Apr. 18, 1922 |
| 1,561,332 | Law | Nov. 10, 1925 |
| 1,645,585 | Burton | Oct. 18, 1927 |
| 2,180,341 | Erickson | Nov. 21, 1939 |

FOREIGN PATENTS

| Number | Country | Date |
|---|---|---|
| 167,261 | Great Britain | 1921 |
| 575,332 | France | 1924 |
| 28,123/30 | Australia | 1931 |